United States Patent
Goyal et al.

(10) Patent No.: US 6,825,293 B1
(45) Date of Patent: Nov. 30, 2004

(54) POLYMER CONTROL THROUGH CO-CATALYST

(75) Inventors: Shivendra Kumar Goyal, Calgary (CA); Timothy Walter Wiwchar, Red Deer (CA); Victoria Ker, Calgary (CA); Mark Kelly, Airdrie (CA)

(73) Assignee: Nova Chemicals (International) S.A. (CH)

( * ) Notice: Subject to any disclaimer, the term of this patent is extended or adjusted under 35 U.S.C. 154(b) by 466 days.

(21) Appl. No.: 09/932,883

(22) Filed: Aug. 20, 2001

(51) Int. Cl.$^7$ .................................................. C08F 4/42
(52) U.S. Cl. .................... 526/124.1; 526/129; 526/352; 526/348; 526/901; 526/124.3
(58) Field of Search ............................. 526/124.1, 129, 526/352, 348, 901, 124.3, 151, 158

(56) References Cited

U.S. PATENT DOCUMENTS

| | | | |
|---|---|---|---|
| 3,779,712 A | 12/1973 | Calvert et al. | 23/288 E |
| 4,252,670 A | 2/1981 | Caunt et al. | 252/429 B |
| 4,302,565 A | 11/1981 | Goeke et al. | 526/88 |
| 4,302,566 A | 11/1981 | Karol et al. | 526/125 |
| 4,543,399 A | 9/1985 | Jenkins, III et al. | 526/70 |
| 4,588,790 A | 5/1986 | Jenkins, III et al. | 526/70 |
| RE33,683 E | 9/1991 | Allen et al. | 502/107 |
| 5,352,749 A | 10/1994 | DeChellis et al. | 526/68 |
| 5,436,304 A | 7/1995 | Griffin et al. | 526/68 |
| 5,633,419 A | 5/1997 | Spencer et al. | 585/522 |
| 6,140,264 A | 10/2000 | Kelly et al. | 502/104 |

FOREIGN PATENT DOCUMENTS

| | | |
|---|---|---|
| CA | 2193758 A1 | 7/1997 |
| EP | 0659773 B1 | 8/1989 |
| EP | 0595574 B1 | 1/1997 |
| EP | 0595 574 B1 * | 1/1997 |
| WO | WO 01/05845 A1 | 1/2001 |

OTHER PUBLICATIONS

J.B. Peri and A.L. Hensley, Jr., The Surface Structure of Silica Gel, The Journal of Physical Chemistry, vol. 72, No. 8, Aug., 1968, pp. 2926–2933.

* cited by examiner

*Primary Examiner*—Ling-Siu Choi
(74) *Attorney, Agent, or Firm*—Kenneth H. Johnson (57) ABSTRACT

Some properties such as dart impact strength, hexane extractables and resin stickiness of a polyethylene copolymer produced in a gas phase polymerization using a Ziegler-Natta catalyst are better controlled by regulating the ratio of aluminum from the co-catalyst to the polymer production rate. This enables one to improve properties such as dart impact strength and reduce hexane extractables by changing the amount of co-catalyst fed into the reactor.

58 Claims, 3 Drawing Sheets

POLYMER CONTROL THROUGH CO-CATALYST

FIELD OF THE INVENTION

The present invention relates to a process for operating a gas phase reactor, preferably fluidized bed polymerization reactor in the presence of a Ziegler-Natta catalyst to reduce resin stickiness and hexane extractables and improve physical properties.

BACKGROUND OF THE INVENTION

In the gas phases polymerization of polyethylene, and particularly fluidized bed polymerization it is desirable to produce a free flowing granular polymer. If the polymer becomes sticky due to a number of factors such as production of oligomers and/or adsorption of comonomer on the polymer the particles tend to agglomerate. If particles start to agglomerate a number of problems may arise. It may be difficult to continue to keep the particles in a fluidized state. The pressure drop across a fluidized bed of polymer particles should be such that it is slightly greater than the mass of the bed divided by the cross section area of the bed. Typically in a fluidized bed gas phase reactor the flow rate of gas through the bed is from about 1.5 to 10, preferably 2 to 6, most preferably from 3 to 5 times the minimum flow rate to fluidize the bed. The superficial gas velocity is typically 0.2 to 0.5 ft/sec above the minimum velocity to fluidize the bed. Typically the superficial gas velocity is from 0.7 ft/sec (0.214 m/sec) to 5.0 ft/sec (1.5 m/sec), preferably from 1 ft/sec (0.305 m/sec) to 3.5 ft/sec (1.07 m/sec). However, the superficial gas velocity is related to the weight average particle diameter, and the density of the gas. If the particles are "sticky" and tend to agglomerate then the superficial gas velocity must increase to maintain that larger particle in a fluidized state. Additionally the flow of gas through the fluidized bed helps to remove the heat of polymerization. Further "sticky" polymer particles are difficult to recover from the reactor, as they tend to plug transfer lines and may also agglomerate in the degassing apparatus, which is used to remove unreacted monomer and comonomer.

U.S. Pat. No. Re 33,683, issued Mar. 22, 1988, reissued Sep. 3, 1991, assigned to Mobil Oil Corporation teaches that if a conventional Ziegler-Natta catalyst is activated only with trimethyl aluminum (TMA) in an amount from 15 to 300, preferably 30 to 150, most preferably from about 40 to 80 ppm in the resulting polymer, the resulting polymer has reduced hexane extractables. The reference teaches the co-catalyst may be used in an amount to provide from 6 to 80, preferably from 8 to 30 moles of co-catalyst (i.e. moles of aluminum) per mole of Ti. The present patent application has been restricted to exclude trimethyl aluminum as an activator.

WO 01/05845 (PCT/US00/19138) published Jan. 25, 2001 in the name of Union Carbide Corporation teaches that another activator such as triethyl aluminum (TEAL) may be used in the activation of the Ziegler-Natta catalysts. However, the patent teaches the molar ratio of total Al:Ti is from 1:1 to 15:1. This is much lower than the ratio of aluminum to titanium according to the present invention.

Canadian Patent Application 2,193,758 laid open Jul. 5, 1997 contains similar teaching to those in WO 01/05845 except that the total atomic (molar) ratio of Al:Ti is from 10:1 to 22:1. However, the aluminum co-catalyst is limited to triethyl aluminum. The present invention is limited to a ratio of total Al (i.e. aluminum in the catalyst and the co-catalyst) to titanium (from the catalyst) of not less than 25:1, typically from 25:1 to 80:1.

The present invention seeks to provide a novel method to operate a gas phase polymerization reactor so that the hexane extractables are lower and in preferred embodiments, with higher alkyl olefin comonomers films of the resulting resin may have a higher dart impact strength.

SUMMARY OF THE INVENTION

The present invention provides in a process for the gas phase polymerization of ethylene and from 0 to 20 weight % of one or more $C_{4-8}$ copolymerizable alpha olefin monomers in the presence of a supported Ziegler-Natta catalyst co-catalyzed with tri $C_{2-6}$ alkyl aluminum, the improvement of controlling the feed of said tri $C_{2-6}$ alkyl aluminum co-catalyst to the reactor to provide from 10 to 50 ppm of aluminum from the co-catalyst based on the polymer production rate provided that the molar ratio of total Al from the catalyst and co-catalyst:Ti from the catalyst is not less than 25:1 (typically from 25:1 to 80:1).

The present invention also provides a process to control a gas phase polymerization of ethylene and from 0 to 20 weight % of one or more $C_{4-8}$ copolymerizable alpha olefin monomers in the presence of a supported Ziegler-Natta catalyst co-catalyzed with tri $C_{2-6}$ alkyl aluminum, comprising maintaining the molar ratio of total Al from the catalyst and co-catalyst:Ti from the catalyst from 25:1 to 80:1 and controlling the feed of said tri $C_{2-6}$ alkyl aluminum co-catalyst to the reactor to provide from 10 to 50 ppm of aluminum from the co-catalyst based on the polymer production rate.

In a particularly preferred embodiment the present invention provides a process for the gas phase polymerization of ethylene and one or more $C_{3-8}$ copolymerizable alpha olefin monomers in the presence of a supported Ziegler-Natta catalyst comprising an aluminum compound of the formula $Al((O)_a R^1)_b X_{3-b}$ wherein a is either 0 or 1, b is an integer from 1 to 3, $R^1$ is a $C_{1-10}$ alkyl radical and X is a chlorine atom, a titanium compound of the formula $Ti(OR^2)_c X_d$ wherein $R^2$ is selected from the group consisting of a $C_{1-4}$ alkyl radical, a $C_{6-10}$ aromatic radical, and a radical of the formula $—COR^3$ wherein $R^3$ is selected from the group consisting of a $C_{1-4}$ alkyl radical and a $C_{6-10}$ aromatic radical, X is selected from the group consisting of a chlorine atom and a bromine atom, c is 0 or an integer up to 4 and d is an integer up to 4 and the sum of c+d is the valence of the Ti atom; a magnesium compound of the formula $(R^5)_e$ $Mg X_{2-e}$ wherein each $R^5$ is independently selected from the group consisting of $C_{1-4}$ alkyl radicals and e is 0, 1 or 2, a $C_{1-6}$ alkyl halide and optionally an electron donor, a molar ratio of Al:Ti from 1:1 to 15:1; a molar ratio of Mg:Ti from 1:1 to 20:1; a molar ratio of halide from the alkyl halide to Mg from 1:1 to 8:1; and a molar ratio of electron donor to Ti from 0:1 to 15:1; said catalyst being co-catalyzed with tri $C_{2-6}$ aluminum, the improvement of controlling the molar ratio of total Al from the catalyst and co-catalyst:Ti from the catalyst from 25:1 to 80:1 and the feed of said tri $C_{2-6}$ alkyl aluminum from the co-catalyst to the reactor to provide from 10 to 50 ppm of aluminum (Al ppm) based on the polymer production rate.

DETAILED DESCRIPTION

As used in this specification the phrase co-catalyst parts per million ("ppm") based on the polymer production rate means the rate of co-catalyst injected (e.g. the mass flow rate of for example TEAL activator) into the reactor divided by the rate of production of resin or polymer coming out of the reactor. Al ppm refers to the injection rate of aluminum from the co-catalyst fed into the reactor divided by the production rate. As the polymerization of ethylene is an exothermic reaction in some instances the production rate of the resin may be determined from the heat balance for the reaction.

In this specification and claims the terms catalyst and catalyst precursor are used interchangeably as some may consider the catalyst the species activated with the co-catalyst. The term catalyst and catalyst precursor are meant to mean the composition before further reaction with tri $C_{2-8}$, preferably $C_{2-6}$ alkyl aluminum in the reactor.

The gas phase, and particularly the fluidized bed gas phase polymerization of ethylene polymers has been known for some time. There is a significant amount of art teaching the formulation of catalysts and there is a significant amount of art relating to the operation of the polymerization process. In the polymerization process a catalyst or catalyst precursor is prepared and injected into the reactor. Typically a co-catalyst is also injected into the reactor. The applicants have discovered that the hexane extractables in the resulting polymer are better controlled by regulating the Al ppm relative to the polymer production rate instead of the Al:Ti ratio such that the molar ratio of total Al from the catalyst and co-catalyst:Ti from the catalyst is from 25:1 to 80:1.

Generally, controlling the Al ppm in the polymer provides a more direct method for controlling the reaction. In the past it has been suggested to control the reactor by controlling the ratio of aluminum in the co-catalyst to titanium in the catalyst (Al:Ti ratio). The difficulty with such a control system is that the Al:Ti ratio is dependent on several parameters including the accuracy of the feeders and the amount of Ti in the catalyst. These parameters are not always accurately/easily controlled. The present approach (ppm of aluminum from the co-catalyst to the production rate) provides a more direct control. Additionally, in the prior art approach of controlling the Al:Ti ratio, if at a constant bed mass the residence time decreases (i.e. the catalyst productivity decreases), while the Al:Ti ratio is controlled at a constant value, the Al ppm in the polymer will increase thus affecting the polymers physical properties and hexane extractables. An additional benefit of the present invention is that it tends to reduce the control error in the process.

Ziegler-Natta catalysts may be used in the gas phase polymerization of ethylene. Typically the catalysts comprise a support, a magnesium compound (optionally in the presence of a halide donor to precipitate magnesium halide), a titanium compound and an aluminum compound, optionally in the presence of an electron donor. The aluminum compound may be added at several stages. It may be on the support, it may be reacted, typically in suspension or solution with the titanium compound or it may be added to a catalyst or catalyst precursor. In accordance with the present invention it is the amount of aluminum from the co-catalyst, typically triethyl aluminum, added to the reactor that is controlled to achieve the desired results.

The support for the catalyst typically comprises an inorganic substrate usually of alumina or silica having a pendant reactive moiety. The reactive moiety may be a siloxy radical or more typically is a hydroxyl radical. The preferred support is silica. The support should have an average particle size from about 10 to 150 microns, preferably from about 20 to 100 microns. The support should have a large surface area typically greater than about 100 $m^2/g$, preferably greater than about 250 $m^2/g$, most preferably from 300 $m^2/g$ to 1,000 $m^2/g$. The support will be porous and will have a pore volume from about 0.3 to 5.0 ml/g, typically from 0.5 to 3.0 ml/g. Supports which are specifically designed to be an agglomeration of sub-particles while useful, are not required.

It is important that the support be dried prior to the initial reaction with an aluminum compound. Generally the support may be heated at a temperature of at least 200° C. for up to 24 hours, typically at a temperature from 500° C. to 800° C. for about 2 to 20 hours. The resulting support will be free of adsorbed water and should have a surface hydroxyl content from about 0.1 to 5 mmol/g of support, preferably from 0.5 to 3 mmol/g.

A silica suitable for use in the present invention has a high surface area, is amorphous silica (surface area of 300 $m^2/gm$; pore volume of 1.65 $cm^3$ per gram). For example, commercially available silicas are marketed under the tradename of Davison® 958 and Davison® 955 by the Davison Chemical Division of W. R. Grace and Company.

The amount of the hydroxyl groups in silica may be determined according to the method disclosed by J. B. Peri and A. L. Hensley, Jr., in J. Phys. Chem., 72 (8), 2926 (1968), the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g. triethyl aluminum) or a silane compound. For example the support may be treated with an aluminum compound of the formula $Al((O)_aR^1)_bX_{3-b}$, wherein a is either 0 or 1, b is an integer from 1 to 3, $R^1$ is a $C_{1-8}$ alkyl radical, and X is a chlorine atom. The aluminum content on the support is included in the ratio of Al:Ti in the catalyst. The amount of aluminum compound is such that the amount of aluminum on the support will be from about 0.5 to 2.5 weight % based on the weight of the support.

There are a number of strategies to combine the components of the catalyst system. For example a number of patents assigned to Union Carbide Corporation, represented by U.S. Pat. No. 4,302,566 to Karol et al., and U.S. Pat. No. 4,302,565 to Goeke et al. both issued Nov. 24, 1981, teach forming a catalyst or catalyst precursor composition from the titanium compound, the magnesium compound, and the electron donor compound and then impregnating the support with the precursor composition and then contacting the impregnated support, typically in the reactor, with the co-catalyst compound in one or more steps.

The catalyst or catalyst precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and in some instances by refluxing these two compounds in the electron donor. After the titanium compound and the magnesium compound are dissolved, the catalyst or catalyst precursor may be isolated by crystallization or by precipitation with a $C_{5-8}$ aliphatic or aromatic hydrocarbon such as hexane, isopentane or benzene.

The crystallized or precipitated catalyst or catalyst precursor may be isolated, in the form of fine, free flowing particles. The catalyst or catalyst precursor may be recovered and then dissolved in a solvent or may be directly used without recovery to impregnate a suitable support as discussed above.

When made as disclosed above the catalyst or catalyst precursor composition has the formula:

$$Mg_m Ti_1(OR)_n X_p [ED]_q \text{ wherein}$$

ED is the electron donor compound,
m is from 0.5 to 56, and preferably from 1.5 to 5,
n is 0, 1 or 2,
p is from 2 to 116, and preferably from 6 to 14,
q is from 2 to 85, and preferably from 4 to 11,
R may be a $C_{1-14}$ aliphatic or aromatic hydrocarbon radical, or COR' wherein R' may be a $C_{1-14}$ aliphatic or aromatic hydrocarbon radical and, X is selected from the group consisting of Cl, Br, I or mixtures thereof, preferably Cl. The subscript for the element titanium (Ti) is the Arabic numeral one. In the above formula the letters m, n, p and q define the molar ratios of the components.

The longevity of this approach is illustrated by above noted WO 01/05845.

Another approach is to impregnate the support with a soluble magnesium compound such as a dialkyl magnesium compound (i.e. $MgR_2$). The Mg is then precipitated with a halogen donating compound. Then the impregnated support is reacted with a titanium compound, and optionally an electron donor and an aluminum compound. These types of approaches are illustrated by ICI's U.S. Pat. No. 4,252,670 issued Feb. 24, 1981 to Caunt et al.; U.S. Pat. No. 5,633,419 issued April 1997 to Spencer et al. assigned to the Dow Chemical Company; EP 0 595 574 issued Jan. 1, 1997 in the name of Berardi, assigned to BP Chemicals Ltd.; and U.S. Pat. No. 6,140,264 issued Oct. 31, 2000 to Kelly et al., assigned to NOVA Chemicals Ltd.

The present invention is applicable to Ziegler-Natta catalysts made using the above techniques provided the catalyst is activated in the reactor (sufficient tri $C_{2-6}$ alkyl aluminum is added to the reactor) in accordance with the teachings herein.

Then the impregnated support is reacted with a titanium compound, and optionally an electron donor and an aluminum compound. These types of approaches are illustrated by ICI's U.S. Pat. No. 4,252,670 issued Feb. 24, 1981 to Caunt et al.; U.S. Pat. No. 5,633,419 issued April 1997 to Spencer et al. assigned to the Dow Chemical Company; EP 0 595 574 issued Jan. 1, 1997 in the name of Berardi, assigned to BP Chemicals Ltd.; and U.S. Pat. No. 6,140,264 issued Oct. 31, 2000 to Kelly et al., assigned to NOVA Chemicals Ltd.

The present invention is applicable to Ziegler-Natta catalysts made using the above techniques provided the catalyst is activated in the reactor (sufficient tri $C_{2-6}$ alkyl aluminum is added to the reactor) in accordance with the teachings herein.

Typically the Ziegler-Natta catalyst will comprise an aluminum compound of the formula $Al((O)_a R^1)_b X_{3-b}$ wherein a is either 0 or 1, b is an integer from 1 to 3, $R^1$ is a $C_{1-10}$ alkyl radical and X is a chlorine atom, a titanium compound of the formula $Ti(OR^2)_c X_d$ wherein $R^2$ is selected from the group consisting of a $C_{1-4}$ alkyl radical, a $C_{6-10}$ aromatic radical, and a radical of the formula —$COR^3$ wherein $R^3$ is selected from the group consisting of a $C_{1-4}$ alkyl radical and a $C_{6-10}$ aromatic radical, X is selected from the group consisting of a chlorine atom and a bromine atom, c is 0 or an integer up to 4 and d is an integer up to 4 and the sum of c+d is the valence of the Ti atom; a magnesium compound of the formula $(R^5)_e Mg\ X_{2-e}$ wherein each $R^5$ is independently a $C_{1-4}$ alkyl radical and e is 0, 1 or 2; an alkyl halide selected from the group consisting of $CCl_4$ or a $C_{3-6}$ secondary or tertiary alkyl halide and optionally an electron donor, a molar ratio of Al to Ti from 1:1 to 15:1; a molar ratio of Mg:Ti from 1:1 to 20:1; a molar ratio of halide from the alkyl halide to Mg from 1:1 to 8:1; and a molar ratio of electron donor to Ti from 0:1 to 15:1.

Typically the catalyst components are reacted in an organic medium such as an inert $C_{4-10}$ hydrocarbon which may be unsubstituted or is substituted by a $C_{1-4}$ alkyl radical. Some solvents include pentane, hexane, heptane, octane, cyclohexane, methyl cyclohexane, hydrogenated naphtha and ISOPAR®E (a solvent available from Exxon Chemical Company) and mixtures thereof.

Typically the aluminum compounds useful in the formation of the catalyst or catalyst precursor in accordance with the present invention have the formula $Al((O)_a R^1)_b X_{3-b}$ wherein a is either 0 or 1, preferably 0, b is an integer from 1 to 3, preferably 3, $R^1$ is a $C_{1-10}$, preferably a $C_{1-8}$ alkyl radical and X is a halogen atom preferably a chlorine or bromine atom. Suitable aluminum compounds include, trimethyl aluminum, triethyl aluminum (TEAL), tri-isobutyl aluminum (TiBAL), diethyl aluminum chloride (DEAC), tri-n-hexyl aluminum (TnHAl), tri-n-octyl aluminum (TnOAl), and mixtures thereof. The aluminum compounds containing a halide may be an aluminum sesqui-halide. Preferably, in the aluminum compound a is 0 and $R^1$ is a $C_{1-8}$ alkyl radical.

The magnesium compound may be a compound of the formula $(R^5)_e Mg\ X_{2-e}$ wherein each $R^5$ is independently a $C_{1-4}$ alkyl radical and e is 0, 1 or 2. Some commercially available magnesium compounds include magnesium chloride, dibutyl magnesium and butyl ethyl magnesium. If the magnesium compound is soluble in the organic solvent it may be used in conjunction with a halogenating agent to form magnesium halide (i.e. $MgX_2$ where X is a halogen preferably chlorine or bromine, most preferably chlorine) which precipitates from the solution (potentially forming a substrate for the Ti compound). Some halogenating agents include $CCl_4$ or a secondary or tertiary halide of the formula $R^6 Cl$ wherein $R^6$ is selected from the group consisting of secondary and tertiary $C_{3-6}$ alkyl radicals. Suitable chlorides include sec-butyl chloride, t-butyl chloride and sec-propyl chloride. The halide is added to the catalyst in a quantity of from 5 to 40 weight %, preferably from 10 to 30 weight % based on the weight of silica. The Cl:Mg molar ratio should be from 1:1 to 8:1, preferably from 1.5:1 to 6:1, most preferably from 1.5:1 to 3:1.

The titanium compound in the catalyst has the formula $Ti(OR^2)_c X_{d-c}$ wherein $R^2$ is selected from the group consisting of a $C_{1-4}$ alkyl radical, a $C_{6-10}$ aromatic radical, and a radical of the formula —$OR^3$ wherein $R^3$ is selected from the group consisting of a $C_{1-4}$ alkyl radical and a $C_{6-10}$ aromatic radical, X is selected from the group consisting of a chlorine atom and a bromine atom, c is 0 or an integer up to 4 and d is an integer up to 4 and the sum of c+d is the valence of the Ti atom. The titanium compound may be selected from the group consisting of $TiCl_3$, $TiCl_4$, $Ti(OC_4H_9)Cl_3$, $Ti(OCOCH_3)Cl_3$ and $Ti(OCOC_6H_5)Cl_3$. Most preferably the titanium compound is selected from the group consisting of $TiCl_3$ and $TiCl_4$.

Generally the titanium in the catalyst or catalyst precursor is present in an amount from 0.25 to 1.25, preferably from 0.25 to 0.70, most preferably from 0.35 to 0.65 weight % based on the final weight of the catalyst (inclusive of the support). As noted above an electron donor may be and in fact is preferably used in the catalysts or catalysts precursor used in accordance with the present invention. The electron donor is selected from the group consisting of $C_{3-18}$ linear or cyclic aliphatic or aromatic ethers, ketones, esters, aldehydes, amides, nitriles, amines, phosphines or siloxanes. Preferably, the electron donor is selected from the group consisting of diethyl ether, dipropyl ether, dibutyl ether, tetrahydrofuran, acetone, ethyl benzoate, and diphenyl ether and mixtures thereof. The electron donor may be used in a molar ratio to the titanium from 0:1 to 15:1 preferably in a molar ratio to Ti from 3:1 to 12:1, most preferably from 3:1 to 10:1.

In the catalyst or catalyst precursor the molar ratio of Mg:Ti may be from 0.5;1 to 50:1, preferably from 1:1 to 20:1, most preferably from 2:1 to 10:1. The molar ratio of aluminum to titanium in the catalyst may be from 1:1 to 15:1, preferably from 2:1 to 12:1, most preferably from 3:1 to 10:1. Optionally all, generally from 0 to not more than about 60 weight %, preferably from 10 to 50 weight %, of the aluminum (compound in the catalyst) may be used to treat the support. The remaining aluminum compound in the catalyst may be added sometime after the titanium addition step preferably after the electron donor step. The molar ratio of halide (from the alkyl halide or $CCl_4$) to Mg may be from 1:1 to 8:1 preferably from 1.5:1 to 6:1, most preferably from 1.5:1 to 3:1. The molar ratio of electron donor, if present, to Ti may be from 3:1 to 12:1, most preferably from 3:1 to 10:1. The molar ratio of Mg:Al in the catalyst or catalyst precursor may be from 0.1:1 to 3:1, preferably from 0.4:1 to 3:1.

The catalyst or catalyst precursor is fed to the reactor, generally above a distributor plate into the bed of growing polymer particles using a metering device. One such device is disclosed in U.S. Pat. No. 3,779,712 issued Dec. 18, 1973 to Calvert et al., assigned to Union Carbide Corporation. The tri $C_{2-5}$ alkyl aluminum (in neat form or in a solution made with a hydrocarbon solvent) is also fed to the bed of growing polymer particles using a liquid metering device. Such devices are known in the art.

The co-catalyst may be selected from the group consisting of tri $C_{2-6}$ alkyl aluminums, alkyl aluminum chlorides, and mixtures thereof. This includes triethyl aluminum, tri propyl aluminum, tributyl aluminum, tri isobutyl aluminum, tri n-hexyl aluminum, diethyl aluminum chloride, dibutyl aluminum chloride, and mixtures thereof. A preferred co-catalyst is triethyl aluminum. While the aluminum halides might be useful in accordance with the present invention they increase the amount of halide in the polymer resulting in increased consumption of additives to neutralize and stabilize the resulting polymer.

The co-catalyst may be fed to the reactor to provide from 10 to 50, preferably 10 to 40, more preferably from 17 to 30, most preferably from 20 to 26 ppm of aluminum (Al ppm) based on the polymer production rate.

In accordance with the present invention the molar ratio of total Al (i.e. aluminum from the catalyst and co-catalyst): Ti (from the catalyst) is not less than 25:1. Typically the molar ratio of total Al (i.e. aluminum from the catalyst and co-catalyst):Ti (from the catalyst) is between 25:1 and 80:1.

In the reactor the gas phase typically comprises the monomers, a balance gas such as nitrogen, possibly a molecular weight control agent such as hydrogen, and depending on the process possibly a condensable liquid (i.e. condensing mode such as disclosed in U.S. Pat. No. 4,543,399 issued Sep. 24, 1985 to Jenkins III et al.; U.S. Pat. No. 4,588,790 issued May 15, 1986 to Jenkins III et al.; and the so-called super condensing mode as disclosed in U.S. Pat. No. 5,352,749 issued Oct. 4, 1994 to DeChellis et al., assigned to Exxon Chemical Patents, Inc. and U.S. Pat. No. 5,436,304 issued Jul. 25, 1995 to Griffen et al., assigned to Exxon Chemical Patents, Inc.).

The monomers comprise ethylene and optionally from 0 up to 20 generally about 0.5 to 16 preferably from 2 to 13, most preferably from 8 to 13 weight % (based on the monomers) of at least one copolymerizable $C_{3-8}$, preferably $C_{4-8}$, alpha olefin. Copolymerizable olefins include butene (1-butene), 4-methyl-1-pentene, hexene (1-hexene) and octene (1-octene), although it may be difficult to keep significant amounts of octene in the gas phase. The polymer may have a density from 0.905 to 0.960 g/cc.

The polymer may be a copolymer containing hexane. If the copolymer contains typically from about 8 to 13 weight % of hexene particularly good dart impact strengths are obtained if triethyl aluminum is used as a co-catalyst in amounts from 50 to 150 ppm of TEAL (12 to 35 Al ppm) preferably 70 to 130 ppm of TEAL (16 to 31 Al ppm), most preferably from 85 to 110 ppm of TEAL (20 to 26 Al ppm) based on the polymer production rate.

Fluidized bed gas phase reactors to make polyethylene are generally operated at low temperatures from about 50° C. up to about 120° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

In some instances, by using the Al ppm control technique to reduce resin stickiness, it is possible to increase the throughput of the reactor. Increases of up to about 20% have been observed. The variability in the properties of the resin and process control parameters including melt index, density, hexane extractables, hydrogen and comonomer response, may be reduced by up to about 50% by using the control method of the present invention.

The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine stabilizers (HALS); process aids such as fatty acids or their derivatives and fluoropolymers optionally in conjunction with low molecular weight esters of polyethylene glycol.

The present invention will now be illustrated by the following non-limiting examples.

EXAMPLE 1

A catalyst was prepared substantially according to example 1 of U.S. Pat. No. 6,140,264 except that tri-n-octyl aluminum was added to the catalyst precursor after the catalyst precursor was contacted with conventional quantities of an electron donor.

The catalyst was then used in the polymerization of ethylene and hexene in a stirred bed reactor substantially as described in the examples in EP 0 659 773 A. The resulting polymer had a target density of about 0.915 g/cc and a target melt index of 0.9.

Several polymerizations were conducted and representative data for a 1.0 mil thick blown film is set forth in Table 1 below.

TABLE 1

| Experimental Number | Polymer Density (g/cc) | Polymer Melt Index ($I_{2.16}$) | Dart Impact Strength[2] (g/mil) | Al:Ti Molar Ratio (Aluminum in Co-catalyst to Ti in Catalyst) | Al (ppm) in Polymer from the Co-catalyst |
|---|---|---|---|---|---|
| Reference std[1] | | | 629 | | |
| 1 | 0.9148 | 1.05 | 654 | 34 | 24 |
| 2 | 0.9149 | 0.96 | 460 | 72 | 47 |
| 3 | 0.9152 | 0.87 | 548 | 76 | 47 |
| 4 | 0.9144 | 0.8 | 682 | 43 | 40 |
| 5 | 0.9160 | 0.86 | 533 | 27 | 28 |

[1]Commercial product used for benchmarking
[2]1 mil thick film

Since the densities and melt indexes of the polymer produced are not identical, the raw data was normalized to similar density and melt index before fitting to an algorithm. The algorithm was capable of reproducing the results of the trials with a high correlation (95% certainty).

Figure 1:
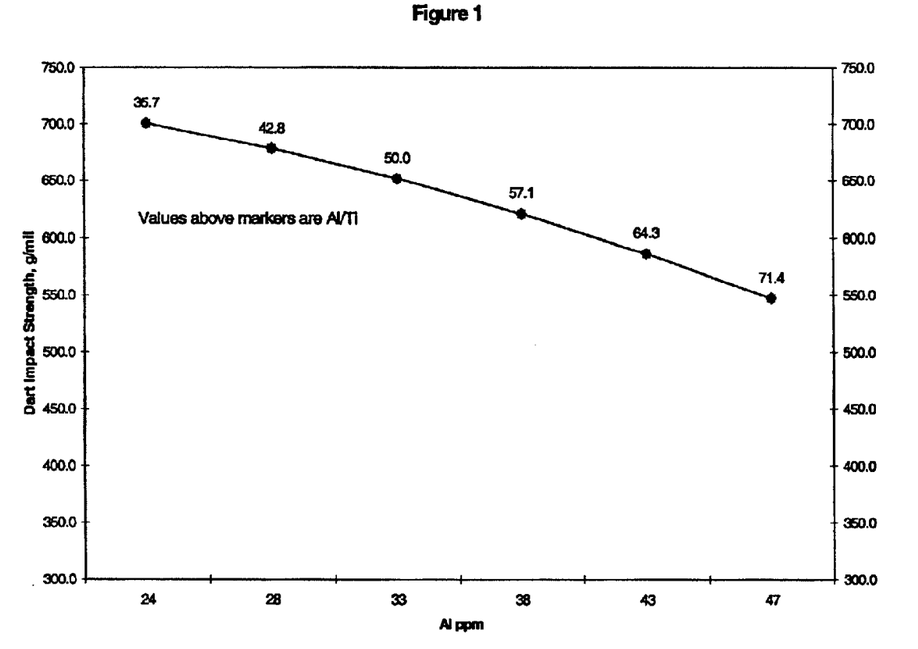
FIG. 1 is a graph prepared from a computer model showing the effect on dart impact strength by changing both the Al:Ti molar ratio (aluminum in co-catalyst to Ti in catalyst) and the aluminum from the co-catalyst fed to reactor based on the polymer production rate (Al ppm).
Figure 2:
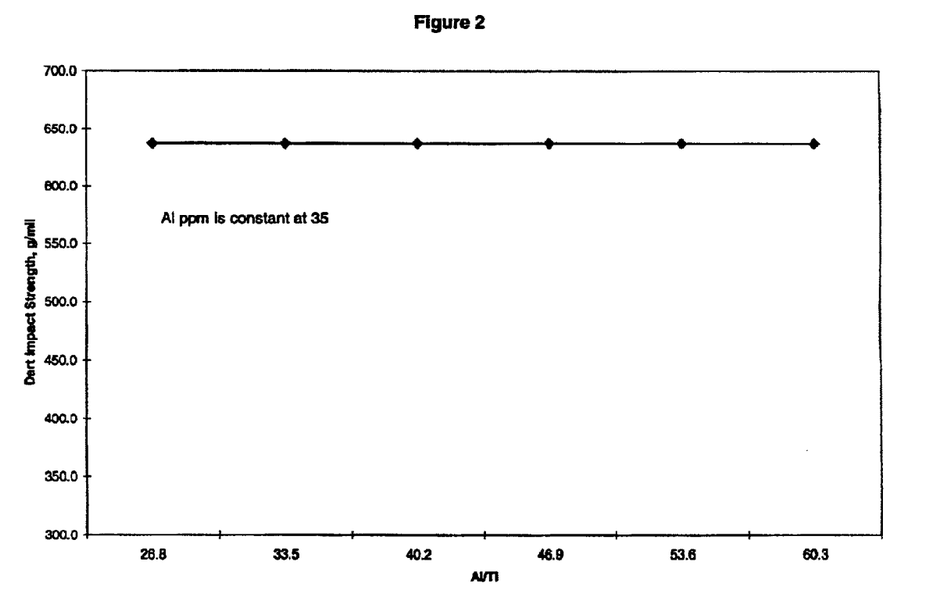
FIG. 2 is a graph prepared from a computer model showing the effect on dart impact strength by changing the Al:Ti molar ratio (aluminum in co-catalyst to Ti In catalyst) while keeping the aluminum from the co-catalyst fed to reactor based on the polymer production rate (Al ppm) constant.
Figure 3:
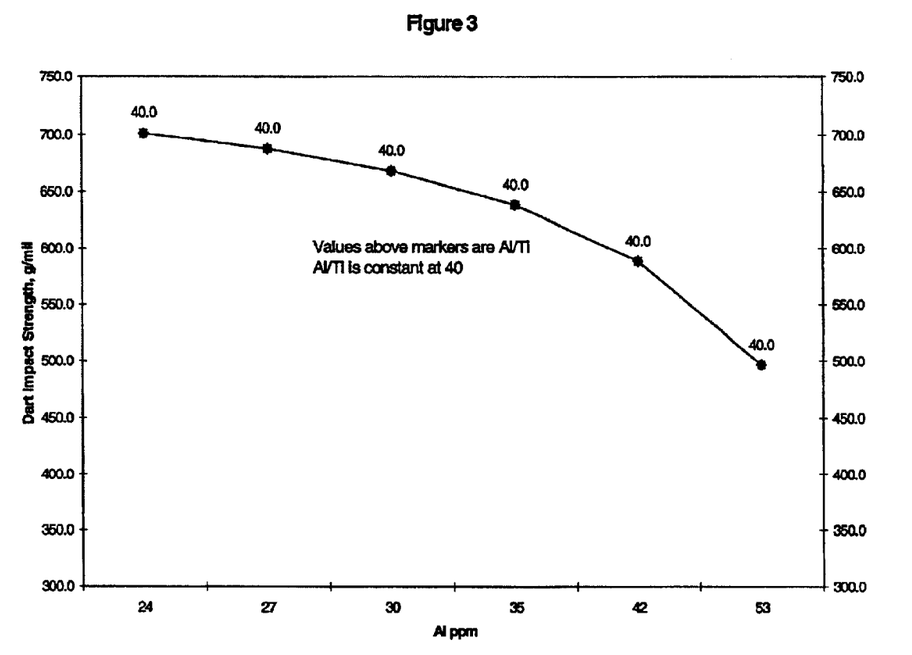
FIG. 3 is a graph prepared from a computer model showing the effect on dart impact strength by changing the amount of aluminum from the co-catalyst fed into the reactor based on the polymer production rate (Al ppm) and keeping the Al:Ti molar ratio (aluminum in co-catalyst to Ti in catalyst) constant.

Using the algorithm a plot (FIG. 1) was made of the dart impact strength while changing both the Al:Ti ratio (aluminum in co-catalyst to Ti in catalyst) and the amount of Al (from the co-catalyst) relative to the production rate (Al ppm). FIG. 1 shows there is a relationship between the dart impact strength of the film and both the amount of Al (from the co-catalyst) relative to the polymer production rate (Al ppm) and the molar ratio of Al:Ti (aluminum in co-catalyst to Ti in catalyst). A second plot (FIG. 2) was prepared using the algorithm to illustrate how the dart impact strength of the film is essentially unaffected by Al:Ti ratio at a constant ratio of Al (from the co-catalyst) relative to the polymer production rate (Al of 35 ppm). The dart impact strength is essentially constant at a constant value of Al ppm. A third plot (FIG. 3) was then prepared from the algorithm to plot the dart impact strength of a film where Al:Ti ratio was kept constant at 40:1 while varying the ratio of Al (from the co-catalyst) to the polymer production rate (Al ppm). FIG. 3 shows that at a constant Al:Ti ratio, there is a significant change in dart impact strength relative to the Al ppm.

EXAMPLE 2

A catalyst was prepared and polymerized according to Example 1. The resulting polymer had a target density of about 0.915 g/cc and a target melt index of 0.9.

Figure 4:
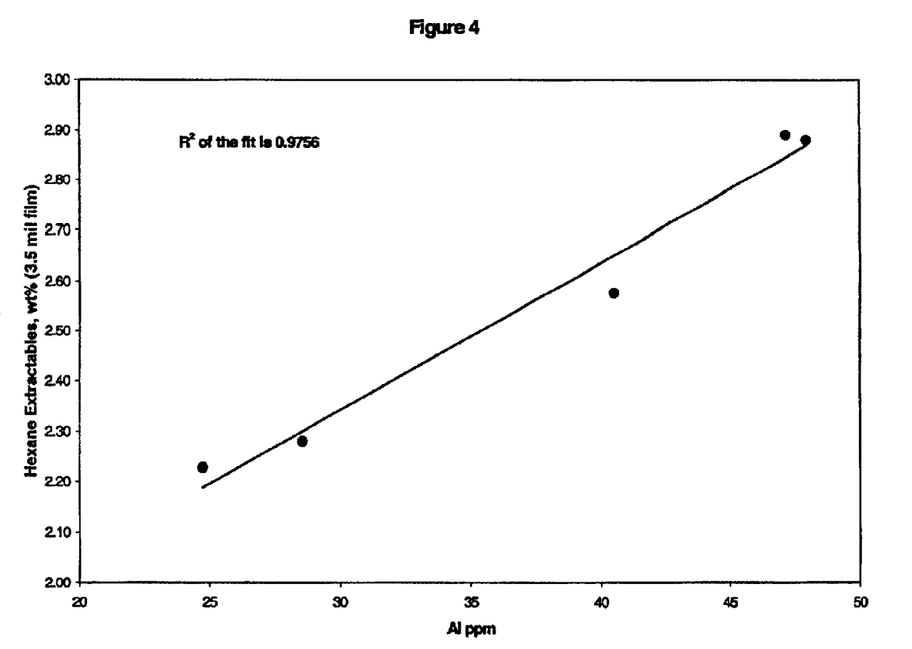
FIG. 4 is a graph illustrating the effect of manipulating the amount of Al from the co-catalyst fed to reactor based on polymer production rate (Al ppm) on hexane extractables.
Figure 5:
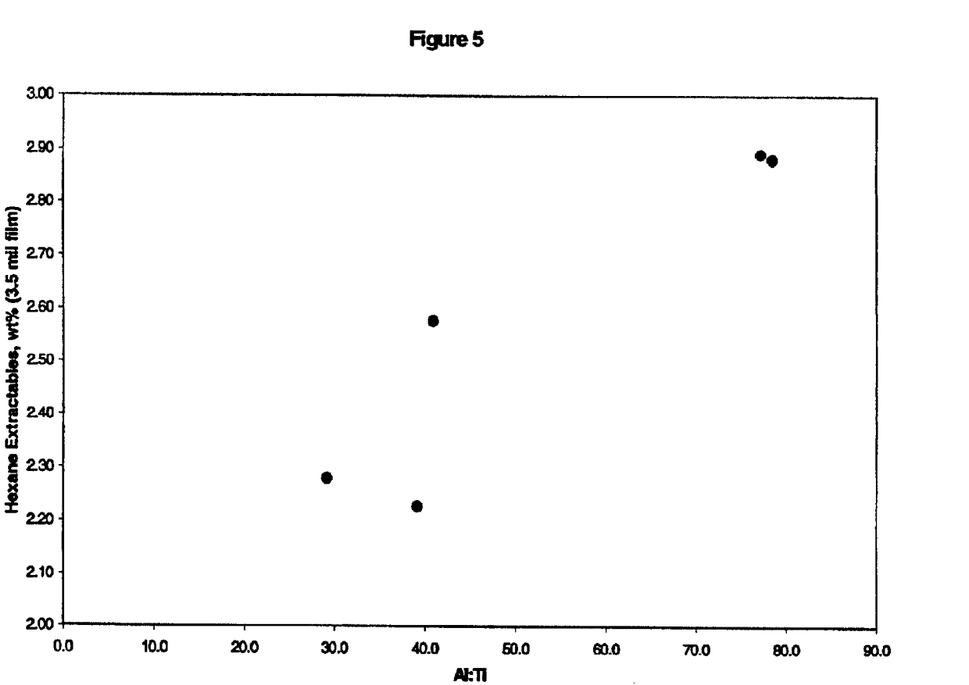
FIG. 5 is a graph illustrating the effect of manipulating the Al:Ti molar ratio (aluminum in co-catalyst to Ti in catalyst) on hexane extractables.

Several polymerization experiments were conducted and results are presented in FIGS. 4 and 5. In the experiments, the Al (from the co-catalyst) relative to production rate (Al ppm) was controlled at 25 ppm, 29 ppm, 41 ppm, 47 ppm and 48 ppm while the corresponding molar ratio of Al (from the co-catalyst):Ti (from the catalyst) was at 39:1, 29:1, 41:1, 77:1 and 78:1. FIG. 4 shows a substantially linear relationship between hexane extractables and the amount of Al (from the co-catalyst) relative to the production rate (Al ppm). A good linear correlation exists between Al ppm utilized in the process and hexane extractables of the resin ($R^2$ is 0.9756). FIG. 5 shows a similar plot except that the hexane extractables are plotted against Al:Ti molar ratios. The results do not fit any linear regression. Two data points in FIG. 5 show that at almost identical Al:Ti molar ratio of 40:1, the hexane extractables varied from 2.23 to 2.58 weight %. However, when the Al:Ti molar ratios were transposed to Al ppm, the resin with the higher hexane extractables was actually produced at higher Al ppm (i.e. 41 ppm compared to 25 ppm).

This example again illustrates the advantage of operating the polymerization process using Al ppm control over Al:Ti molar ratio control.

EXAMPLE 3

In a third example the above catalyst was used to make two similar polymers with the only difference being the type of co-catalyst used. In experiment 6 of Table 2 triethyl aluminum was used while in experiment 7, tri-n-hexyl aluminum was used. It is evident from the data in Table 2 that at a constant Al ppm essentially similar dart impact strength of film can be obtained independent of co-catalyst type.

TABLE 2

| Experimental Number | Polymer Density (g/cc) | Polymer Melt Index ($I_{2.16}$) | Dart Impact Strength[2] (g/mil) | Al:Ti Molar Ratio (Aluminum in Co-catalyst to Ti in Catalyst) | Al (ppm) in Polymer from the Co-catalyst |
|---|---|---|---|---|---|
| Reference std[1] | | | 458 | | |
| 6 | .9148 | 0.80 | 401 | 33 | 21[3] |
| 7 | .9144 | 0.78 | 426 | 26 | 20[4] |

[1]Commercial product used for benchmarking
[2]1 mil thick film
[3]Triethyl aluminum is used as the co-catalyst
[4]Tri-n-hexyl aluminum is used as the co-catalyst

What is claimed is:

1. In a process for the gas phase polymerization of ethylene and from 0 to 20 weight % of one or more $C_{4-8}$ copolymerizable alpha olefin monomers in the presence of a supported Ziegler-Natta catalyst co-catalyzed with a co-catalyst selected from the group consisting of tri $C_{2-6}$ alkyl aluminum, alkyl aluminum halides and mixtures thereof, the improvement of controlling the feed of said co-catalyst to the reactor to provide from 10 to 50 ppm of aluminum from the co-catalyst based on the polymer production rate provided that the molar ratio of total Al from the catalyst and co-catalyst:Ti from the catalyst is from 25:1 to 80:1.

2. The process according to claim 1, wherein the co-catalyst is used in an amount to provide from 10 to 40 ppm of aluminum from the co-catalyst based on the polymer production rate.

3. The process according to claim 2, wherein the Ziegler-Natta catalyst comprises an aluminum compound of the formula $Al((O)_aR^1)_bCl_{3-b}$ wherein a is either 0 or 1, b is an integer from 1 to 3, $R^1$ is a $C_{1-10}$ alkyl radical, a titanium compound of the formula $Ti(OR^2)_cX_d$ wherein $R^2$ is selected from the group consisting of a $C_{1-4}$ alkyl radical, a $C_{6-10}$ aromatic radical, and a radical of the formula $—COR^3$ wherein $R^3$ is selected from the group consisting of a $C_{1-4}$ alkyl radical and a $C_{6-10}$ aromatic radical, X is selected from the group consisting of a chlorine atom and a bromine atom, c is 0 or an integer up to 4 and d is an integer up to 4 and the sum of c+d is the valence of the Ti atom; a magnesium compound of the formula $(R^5)_eMg\ X_{2-e}$ wherein each $R^5$ is independently a $C_{1-4}$ alkyl radical and e is 0, 1 or 2; an alkyl halide selected from the group consisting of $CCl_4$ or a $C_{3-6}$ secondary or tertiary alkyl halide and optionally an electron donor, said catalyst having a molar ratio of Al to Ti from 1:1 to 15:1; a molar ratio of Mg:Ti from 1:1 to 20:1; a molar ratio of halide from the alkyl halide to Mg from 1:1 to 8:1; a molar ratio of electron donor to Ti from 0:1 to 15:1 and the titanium is present in the catalyst in an amount from 0.25 to 1.25 weight % inclusive of the support.

4. The process according to claim 3, wherein in the catalyst the molar ratio of Al:Ti is from 4:1 to 10:1.

5. The process according to claim 4, wherein in the catalyst the molar ratio of Mg:Ti is from 2:1 to 12:1.

6. The process according to claim 5, wherein in the catalyst the titanium component is selected from the group consisting of $TiCl_3$, $TiCl_4$, $Ti(OC_4H_9)Cl_3$, $Ti(OCOCH_3)Cl_3$ and $Ti(OCOC_6H_5)Cl_3$.

7. The process according to claim 6, wherein in the catalyst the aluminum compound is selected from the group consisting of trimethyl aluminum, triethyl aluminum, tri iso-butyl aluminum, tri-n-hexyl aluminum, tri-octyl aluminum, diethyl aluminum chloride and mixtures thereof.

8. The process according to claim 7, wherein in the catalyst the magnesium compound is selected from the group consisting of magnesium chloride, dibutyl magnesium and butyl ethyl magnesium, provided if the magnesium compound is other than magnesium chloride the alkyl halide is present in an amount to provide a molar ratio of halogen:Mg from 1.5:1 to 6:1.

9. The process according to claim 8, wherein in the catalyst the alkyl halide is a $C_{3-6}$ secondary or tertiary alkyl chloride.

10. The process according to claim 9, wherein the electron donor is selected from the group consisting of $C_{3-18}$ linear or cyclic aliphatic or aromatic ethers, ketones, esters, aldehydes, amides, nitriles, amines, phosphines or siloxanes.

11. The process according to claim 10, wherein the support is an inorganic support having an average particle size from about 10 to 150 microns, a surface area greater than 100 $m^2/g$, a pore volume from about 0.3 to 5.0 ml/g, a surface hydroxyl content from about 0.1 to 5 mmol/g of support.

12. The process according to claim 11, wherein the electron donor is present in an amount to provide a molar ratio of electron donor to the titanium from 3:1 to 12:1.

13. The process according to claim 12, wherein the electron donor is selected from the group consisting of diethyl ether, dipropyl ether, dibutyl ether, tetrahydrofuran, acetone, ethyl benzoate, and diphenyl ether and mixtures thereof.

14. The process according to claim 13, wherein in the catalyst from 0 to 60 weight % of the aluminum compound of the formula $Al((O)_aR^1)_bCl_{3-b}$ wherein a is either 0 or 1, b is an integer from 1 to 3, $R^1$ is a $C_{1-8}$ alkyl radical, is used to treat the support and the aluminum content on the support is included in the ratio of Al:Ti in the catalyst.

15. The process according to claim 14, wherein the remaining aluminum compound in the catalyst is added after the addition of the titanium compound.

16. The process according to claim 15, wherein the titanium compound is selected from the group consisting of $TiCl_3$ and $TiCl_4$.

17. The process according to claim 16, wherein in the catalyst the Ti is present in an amount from 0.25 to 0.70 weight % inclusive of the support.

18. The process according to claim 17, wherein the co-catalyst is triethyl aluminum.

19. The process according to claim 17, wherein the co-catalyst is tri-isobutyl aluminum.

20. The process according to claim 17, wherein the co-catalyst is tri-n-hexyl aluminum.

21. The process according to claim 18, wherein the comonomer is present in an amount from 0.5 to 16 weight % and is selected from the group consisting of butene, 4-methyl pentene, hexene, and a mixture thereof.

22. The process according to claim 21, wherein the comonomer is hexene and is present in an amount from 8 to 13 weight %.

23. The process according to claim 22, wherein the triethyl aluminum is used in an amount to provide from 16 to 31 ppm of aluminum.

24. The process according to claim 19, wherein the comonomer is present in an amount from 0.5 to 16 weight % and is selected from the group consisting of butene, 4-methyl pentene, hexene, and a mixture thereof.

25. The process according to claim 24, wherein the comonomer is hexene and is present in an amount from 8 to 13 weight %.

26. The process according to claim 25, wherein the tri-isobutyl aluminum is used in an amount to provide from 16 to 31 ppm of aluminum.

27. The process according to claim 20, wherein the comonomer is present in an amount from 0.5 to 16 weight % and is selected from the group consisting of butene, 4-methyl pentene, hexene, and a mixture thereof.

28. The process according to claim 27, wherein the comonomer is hexene and is present in an amount from 8 to 13 weight %.

29. The process according to claim 28, wherein the tri-n-hexyl aluminum is used in an amount to provide from 16 to 31 ppm of aluminum.

30. A process to control a gas phase polymerization of ethylene and from 0 to 20 weight % of one or more $C_{4-8}$ copolymerizable alpha olefin monomers in the presence of a supported Ziegler-Natta catalyst co-catalyzed with tri $C_{2-6}$ alkyl aluminum, comprising maintaining the molar ratio of total Al from the catalyst and co-catalyst:Ti from the catalyst from 25:1 to 80:1 and controlling the feed of said tri $C_{2-6}$ alkyl aluminum co-catalyst to the reactor to provide from 10 to 50 ppm of aluminum from the co-catalyst based on the polymer production rate.

31. The process according to claim 30, wherein the co-catalyst is used in an amount to provide from 10 to 40 ppm of aluminum from the co-catalyst based on the polymer production rate.

32. The process according to claim 31, wherein the Ziegler-Natta catalyst comprises an aluminum compound of the formula $Al((O)_aR^1)_bCl_{3-b}$ wherein a is either 0 or 1, b is an integer from 1 to 3, $R^1$ is a $C_{1-10}$ alkyl radical, a titanium compound of the formula $Ti(OR^2)_c X_d$ wherein $R^2$ is selected from the group consisting of a $C_{1-4}$ alkyl radical, a $C_{6-10}$ aromatic radical, and a radical of the formula —$COR^3$ wherein $R^3$ is selected from the group consisting of a $C_{1-4}$ alkyl radical and a $C_{6-10}$ aromatic radical, X is selected from the group consisting of a chlorine atom and a bromine atom, c is 0 or an integer up to 4 and d is an integer up to 4 and the sum of c+d is the valence of the Ti atom; a magnesium compound of the formula $(R^5)_e Mg\, X_{2-e}$ wherein each $R^5$ is independently a $C_{1-4}$ alkyl radical and e is 0, 1 or 2; an alkyl halide selected from the group consisting of $CCl_4$ or a $C_{3-6}$ secondary or tertiary alkyl halide and optionally an electron donor, said catalyst having a molar ratio of Al to Ti from 1:1 to 15:1; a molar ratio of Mg:Ti from 1:1 to 20:1; a molar ratio of halide from the alkyl halide to Mg from 1:1 to 8:1; a molar ratio of electron donor to Ti from 0:1 to 15:1 and the titanium is present in the catalyst in an amount from 0.25 to 1.25 weight % inclusive of the support.

33. The process according to claim 32, wherein in the catalyst the molar ratio of Al:Ti is from 4:1 to 10:1.

34. The process according to claim 33, wherein in the catalyst the molar ratio of Mg:Ti is from 2:1 to 12:1.

35. The process according to claim 34, wherein in the catalyst the titanium component is selected from the group consisting of $TiCl_3$, $TiCl_4$, $Ti(OC_4H_9)Cl_3$, $Ti(OCOCH_3)Cl_3$ and $Ti(OCOC_6H_5)Cl_3$.

36. The process according to claim 35, wherein in the catalyst the aluminum compound is selected from the group consisting of trimethyl aluminum, triethyl aluminum, tri iso-butyl aluminum, tri-n-hexyl aluminum, tri-octyl aluminum, diethyl aluminum chloride and mixtures thereof.

37. The process according to claim 36, wherein in the catalyst the magnesium compound is selected from the group consisting of magnesium chloride, dibutyl magnesium and butyl ethyl magnesium, provided if the magnesium compound is other than magnesium chloride the alkyl halide is present in an amount to provide a molar ratio of halogen:Mg from 1.5:1 to 6:1.

38. The process according to claim 37, wherein in the catalyst the alkyl halide is a $C_{3-6}$ secondary or tertiary alkyl chloride.

39. The process according to claim 38, wherein the electron donor is selected from the group consisting of $C_{3-18}$ linear or cyclic aliphatic or aromatic ethers, ketones, esters, aldehydes, amides, nitriles, amines, phosphines or siloxanes.

40. The process according to claim 39, wherein the support is an inorganic support having an average particle size from about 10 to 150 microns, a surface area greater than 100 m$^2$/g, a pore volume from about 0.3 to 5.0 ml/g, a surface hydroxyl content from about 0.1 to 5 mmol/g of support.

41. The process according to claim 40, wherein the electron donor is present in an amount to provide a molar ratio of electron donor to the titanium from 3:1 to 12:1.

42. The process according to claim 41, wherein the electron donor is selected from the group consisting diethyl ether, dipropyl ether, dibutyl ether, tetrahydrofuran, acetone, ethyl benzoate, and diphenyl ether and mixtures thereof.

43. The process according to claim 42, wherein in the catalyst from 0 to 60 weight % of the aluminum compound of the formula $Al((O)_a R^1)_b Cl_{3-b}$ wherein a is either 0 or 1, b is an integer from 1 to 3, $R^1$ is a $C_{1-8}$ alkyl radical, is used to treat the support and the aluminum content on the support is included in the ratio of Al:Ti in the catalyst.

44. The process according to claim 43, wherein the remaining aluminum compound in the catalyst is added after the addition of the titanium compound.

45. The process according to claim 44, wherein the titanium compound is selected from the group consisting of $TiCl_3$ and $TiCl_4$.

46. The process according to claim 45, wherein in the catalyst the Ti is present in an amount from 0.25 to 0.70 weight % inclusive of the support.

47. The process according to claim 46, wherein the co-catalyst is triethyl aluminum.

48. The process according to claim 46, wherein the co-catalyst is tri-isobutyl aluminum.

49. The process according to claim 46, wherein the co-catalyst is tri-n-hexyl aluminum.

50. The process according to claim 47, wherein the comonomer is present in an amount from 0.5 to 16 weight % and is selected from the group consisting of butene, 4-methyl pentene, hexene, and a mixture thereof.

51. The process according to claim 50, wherein the comonomer is hexene and is present in an amount from 8 to 13 weight %.

52. The process according to claim 51, wherein the triethyl aluminum is used in an amount to provide from 16 to 31 ppm of aluminum.

53. The process according to claim 48, wherein the comonomer is present in an amount from 0.5 to 16 weight % and is selected from the group consisting of butene, 4-methyl pentene, hexene, and a mixture thereof.

54. The process according to claim 53, wherein the comonomer is hexene and is present in an amount from 8 to 13 weight %.

55. The process according to claim 54, wherein the tri-isobutyl aluminum is used in an amount to provide from 16 to 31 ppm of aluminum.

56. The process according to claim 49, wherein the comonomer is present in an amount from 0.5 to 16 weight % and is selected from the group consisting of butene, 4-methyl pentene, hexene, and a mixture thereof.

57. The process according to claim 56, wherein the comonomer is hexene and is present in an amount from 8 to 13 weight %.

58. The process according to claim 57, wherein the tri-n-hexyl aluminum is used in an amount to provide from 16 to 31 ppm of aluminum.

* * * * *